United States Patent
Willis H. Shapely

[11] 3,875,394
[45] Apr. 1, 1975

[54] CORRELATION TYPE PHASE DETECTOR

[76] Inventors: Willis H. Shapely, Acting Administrator of the National Aeronautics and Space Administration with respect to an invention of; William D. T. Davies, Getzville, N.Y.; Stephen C. Martin, Niagara Falls, Ontario, Canada

[22] Filed: Apr. 20, 1973

[21] Appl. No.: 353,162

[52] U.S. Cl. ........ 235/181, 179/15 BC, 235/150.53, 324/83 Q, 328/133
[51] Int. Cl. .......................... G06g 7/19, G06g 7/22
[58] Field of Search ....... 235/181, 150.53; 328/133, 328/134; 307/232; 324/85, 83; 325/444

[56] References Cited
UNITED STATES PATENTS

| | | | |
|---|---|---|---|
| 3,602,812 | 8/1971 | Paradise | 324/85 |
| 3,631,351 | 12/1971 | Paine et al. | 328/133 |
| 3,641,447 | 2/1972 | Gaines et al. | 328/134 |
| 3,665,304 | 5/1972 | Maybach | 324/85 |
| 3,701,894 | 10/1972 | Low et al. | 235/181 |
| 3,714,566 | 1/1973 | Kang | 235/181 |

Primary Examiner—Felix D. Gruber
Attorney, Agent, or Firm—R. F. Kempf; John R. Manning

[57] ABSTRACT

The phase angles of each of a plurality of frequency multiplexed signals derived on a common lead and having predetermined frequencies are determined relative to predetermined phase angles of reference waves having the same frequencies as the signals. Correlator means responds to the plural signals and reference waves to derive signals indicative of the orthogonal cross correlations of one reference wave with the signal for each frequency. The correlator means includes integration means that is activated for the same time period for each cross correlation of each frequency. The activating period is an integral multiple of the reciprocal of a frequency that is a common factor of the predetermined frequencies. The integration means thereby derives, at the end of each activation period, first and second signals respectively indicative of sin $\phi$ and cos $\phi$ for each of the frequencies. A computer means responds to the first and second signals for each of the frequencies to derive an indication of $\phi$ for each of the frequencies.

10 Claims, 2 Drawing Figures

CORRELATION TYPE PHASE DETECTOR

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

FIELD OF INVENTION

The present invention relates generally to phase measuring devices, and more particularly, to a correlation type phase measuring device wherein an integrator is activated for a time period that is an integral multiple of the period of a signal being measured.

BACKGROUND OF THE INVENTION

One of the well known techniques for extracting the phase angle, $\phi$, from a signal $[A \sin(\omega t + \phi)]$ of angular frequency, $\omega$, is the correlation method, in which the signal is first multiplied by two orthogonal reference waves $[B \sin \omega t]$ and $[B \cos \omega t]$ of the same frequency as the signal to form the product signals:

$$[B \sin \omega t] [A \sin(\omega t + \phi)] \quad (1)$$

$$[B \cos \omega t] [A \sin(\omega t + \phi)] \quad (2)$$

By integrating these two product signals, approximations of $\sin \phi$ and $\cos \phi$ are derived and $\phi$ is found from $$\phi = \tan^{-1}[\sin\phi/\cos\phi] \quad (3)$$

The approximations of $\sin \phi$ and $\cos \phi$ are formed by passing the two product signals through separate low pass filters or integrators (i.e., the signals are averaged) which derive correlation signals represented by:

$$V_1 = \int_0^T \left(\frac{A \times B}{2}\right) \cos \phi \, dt - \int_0^T \left(\frac{A \times B}{2}\right) \cos(2\omega t + \phi) \, dt \quad (4)$$

and $$V_2 = \int_0^T \left(\frac{A \times B}{2}\right) \sin \phi \, dt + \int_0^T \left(\frac{A \times B}{2}\right) \sin(2\omega t + \phi) \, dt \quad (5)$$

where: $T$ = integration time.
The first terms on the right sides of Equations (4) and (5) reduce to:

$$T(A \times B/2) \cos \phi \quad (6)$$

and $$T(A \times B/2) \sin \phi \quad (7)$$

The reduction of the second terms depends, however, upon the relationship between $T$ and $\omega$, and the values thereof vary from zero to $\pm (A \times B/\omega)$.

This second term represents the errors in $V_1$ and $V_2$ due to the integration so that the larger of the integration time, $T$, the smaller the proportional error. Typically, the integration time is at least several hundred cycles of the signal being measured. Hence, to provide an accurate indication of phase angle, this prior art technique requires a relatively long integration time which detracts from its use in many situations wherein phase information must be derived in a minimum time period.

A system has been devised which relies upon the correlation technique to provide, theoretically, an indication of phase angle in a time period as short as one-half a cycle of a signal being measured. Such a system is disclosed in Sheftelman, U.S. Pat. No. 3,249,868, wherein outputs of the two integrators, each responsive to a product signal, are applied to a threshold device. The threshold device activates the integrators so that only one integrator is responsive to a product signal at a time. In response to the output of the integrator being less than a threshold value, the integrator remains energized. In response to the integrator reaching the threshold value, that integrator is deactivated and the other integrator is energized until the output thereof reaches the threshold. Theoretically it appears that systems operating in accordance with the Sheftleman device are susceptible to inaccuracies for the same reasons as the typical correlators, since the integrators may reach the threshold at a time other than after an integral multiple of the cycle period of the signal being measured. Also, a threshold device by its very nature is subject to relatively great inaccuracies.

BRIEF DESCRIPTION OF THE INVENTION

In accordance with the present invention, theoretical errors in prior art correlation techniques for determining phase angle are completely eliminated by activating the integrators for a time period equal exactly to an integral multiple of the time required for one cycle of the signal being measured. Considering the second terms on the right side of Equations (4) and (5), these terms reduce to zero if $T$ is selected always to equal $N/f$, where $2\pi f = \omega$ and $N$ equals any positive integer. Selection of $T = N/f$ can easily be attained by activating the integrators with a time reference source of constant frequency and phase. By always reducing the value of the second terms of Equations (4) and (5) to zero, the outputs of the integrators are always representative of $\cos \phi$ and $\sin \phi$. Thereby, the time required to derive the phase angle information can be very precisely set to a relatively short interval, such as several cycles of the signal being measured. Theoretically, the integrators can be activated for only one cycle of the signal being measured, but such a short integration period can result in errors due to noise on the signal being measured.

A feature of the invention is that a plurality of signals having different frequencies can be simultaneously applied as frequency multiplexed signals on a common line to the correlation phase measuring device of the present invention, whereby a different correlation is provided for each of the frequencies. By selecting the different frequencies to be a common multiple of a further frequency, the integrators included in the correlator for each frequency can be activated for identical time intervals.

A further advantage of the present invention, which results from separate correlation operations being performed for each frequency, enables the phase angle for each frequency to be detected at a relatively high power level, without narrow band filters. In contrast, typical prior art systems for detecting phase angle of frequency multiplexed signals on a single signal carrying line have relied upon detecting the phase of one frequency (generally the highest frequency), and comparing the detected signal with the remaining signals or by feeding each frequency through a separate narrow band filter, which reduces detection time and/or requires a wide separation between the different frequencies. Wide separation requires wide bandwidth in a transmission link for the signals.

In accordance with a further feature of the invention, inherent inaccuracies of analog devices may be obviated by utilizing digital techniques. In order to achieve data rates for typical signals to be measured with the present system, the highest frequency of which is 8575 Hertz, at a sampling rate of three samples per cycle of the highest frequency (which has been experimentally demonstrated as being close to the lowest possible sampling rate), sampling must be achieved at a rate of 25,725 Hertz per signal, which translates into an overall sampling rate of the time multiplexed signal of 231,525 Hertz. This very high sampling rate, which allows on the average of only 4.32 microseconds between samples, is not sufficient for most computers to perform multiplication of a sampled digital signal with digital values for the sine and cosine functions. While offline techniques, involving storage of the time multiplexed signal, can be employed, such techniques are generally not desirable.

It is, therefore, desirable in a digital type system to eliminate the requirement for multiplication of the time multiplexed signal with the reference waves. Multiplication can be avoided, effectively, by sampling the frequency multiplexed signal at times corresponding with 0°, 90°, 180°, and 270° phase intervals of the reference waves, at which times the reference waves have values of 0, or ±1. Multiplication by ±1, or 0 is very easily implemented because it merely involves a selection as to whether a signal should be switched to a register, and whether the signal switched to the register is fed to the register with original or reversed polarity. The selective polarity reversal merely involves changing a binary bit in the most significant bit position of a digital signal.

It is, therefore, an object of the present invention to provide a new and improved correlation system for determining the phase of a signal.

Another object of the invention is to provide a new and improved system, of high speed, always accurate operation, for determining the phase of a signal.

An additional object of the invention is to provide a new and improved system for determining the phase of each of a number of frequency multiplexed signals sharing a common line.

An additional object of the invention is to provide a new and improved system for determining the phase of each of a plurality of frequency multiplexed signals on a common line by activating correlation integrators for the different frequencies for the same time interval.

An additional object of the invention is to provide a new and improved system for detecting thet phase of each of a multiplicity of signals having a relatively narrow frequency spacing and that are frequency multiplexed on a common line, without using narrow band filters to separate the frequencies.

A further object of the invention is to provide a new and improved system for determining the phase of each of a plurality of signals frequency multiplexed on a common signal carrying line by utilizing digital circuitry.

A further object of the invention is to provide a system for detecting phase angle of each of a multiplicity of signals frequency multiplexed on a common line by utilizing correlation techniques, wherein multiplication is performed by sampling the signal only at times corresponding with a reference wave having values of 0 and ±1.

A further object of the invention is to provide a system for detecting the phase angle of each of a plurality of signals frequency multiplexed on a single signal carrying line wherein the frequency separation between adjacent frequencies is as low as 25 Hertz and the frequencies are on the order of 8,000 Hertz, without the need for very narrow band filters, which require long correlation integration times.

The above and still further objects, features and advantages of the present invention will become apparent upon consideration of the following detailed description of several specific embodiments thereof, especially when taken in conjunction withe the accompanying drawing.

DETAILED DESCRIPTION OF THE DRAWING

Figure 1:
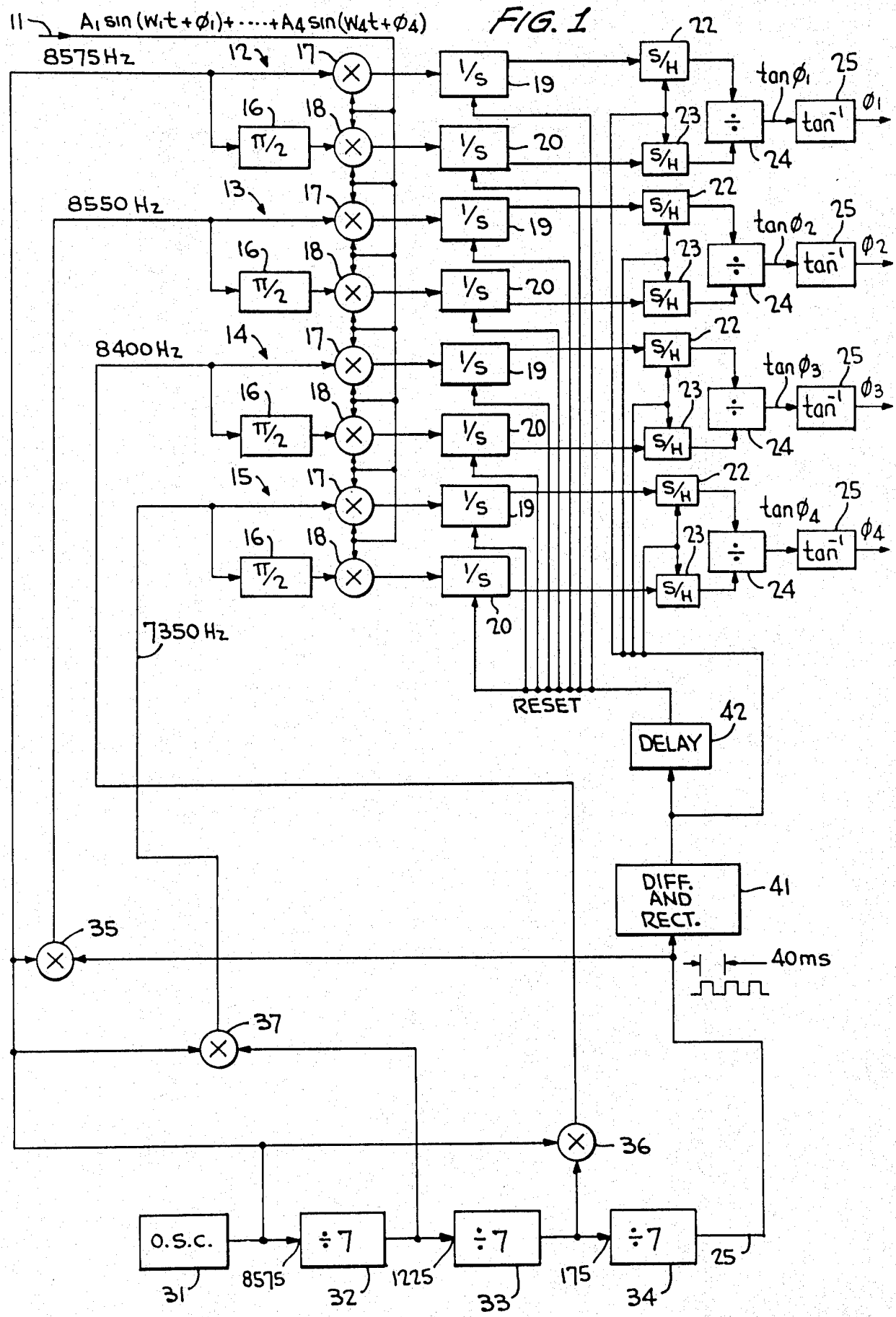
FIG. 1 is a block diagram of an analog embodiment of the present invention.

Reference is now made to FIG. 1 of the drawing wherein there is illustrated a system for determining the phase angle of a plurality of signals, four in the illustrated embodiment, which are frequency multiplexed on a common signal carrying line 11. Each of the four signals has a different frequency ($f_1, f_2, f_3, f_4$), such that the different frequencies have a common factor. In one typical example, wherein the frequencies are multiples of 25 Hertz, the frequencies are:

TABLE I $f_1 = 8575$ Hertz
$f_2 = 8550$ Hertz
$f_3 = 8400$ Hertz
$f_4 = 7350$ Hertz The four signals are of variable phase relative to locally generated reference sinusoidal waves having constant frequency and phase, and equal in frequency to the four different frequencies. Broadly, the object of the invention is to detect the phase angles ($\phi_1, \phi_2, \phi_3, \phi_4$) for the four different frequencies ($f_1, f_2, f_3, f_4$) of the frequency multiplexed signal relative to the phases of the reference waves. In a typical embodiment, the phase angles are impressed on the four frequencies by transmitting the signals with known phases from the location of the phase measuring system illustrated in FIG. 1 (by suitable transmission means, not shown) to a remote location, where the four signals are phase modulated and retransmitted back to the system illustrated in FIG. 1. Such phase transmission systems are well known to those skilled in the art, as disclosed by U.S. Pat. No. 3,534,367 to Laughlin et al.

The signal on lead 11 is applied in parallel to four orthogonal cross correlation channels 12, 13, 14 and 15, one of which is provided for each of $f_1, f_2, f_3,$ and $f_4$. The channel for each frequency $f_i$ (where $i$ is selectively 1, 2, 3 and 4) is driven by a reference wave having a frequency $f_i$ equal to the frequency of one of the signals on lead 11. Thereby, correlation channels 12, 13, 14 and 15 are respectively responsive to reference waves of frequencies $f_1, f_2, f_3,$ and $f_4$. Each correlation channel includes a phase shifter 16, designed to introduce a 90 degree phase shift for the frequency of the reference, sinusoidal wave applied to the channel. The reference wave and the ninety degree phase shifted replica thereof, as derived from phase shifter 16, are respectively supplied to signal multipliers 17 and 18, which are preferably balanced modulators or mixers and are also responsive to the frequency multiplexed signal on lead 11. The outputs of multipliers 17 and 18 include a d.c. component, given by the first term on the right side of Equations (4) and (5), as well as a number of higher frequency modulation terms, that include: sum and difference frequencies and a term having a frequency twice the frequency of the reference wave supplied to the channel.

The output signals of modulators 17 and 18 are respectively applied to integrators 19 and 20 which derive the orthogonal cross correlation signals representing sin $\phi$ and cos $\phi$ for each frequency. Integrators 19 and 20 of all of the channels are activated simultaneously for an equal time period. The activation time period is an integral multiple, including one, of the frequency that is a common factor for the several frequencies ($f_1, f_2, f_3,$ and $f_4$); in the present instance, the activation time is the reciprocal of 25 Hertz, 40 milliseconds, or an integral multiple of 40 milliseconds. To this end, each of integrators 19 and 20 is reset to zero every 40 milliseconds (or an integral multiple thereof) immediately after the signal therein has been sampled.

Because integrators 19 and 20 are activated for a time that is equal to or an integral multiple of the period of a frequency that is a common factor for the several frequencies on line 11, the modulation frequencies, as well as twice the reference frequencies, for each channel are integrated to a zero value after the integration process has been completed. Therefore, immediately prior to each of the integrators being reset, the magnitude of the signal derived thereby is indicative of the sine and cosine of the phase angle between the reference frequency for the channel and the phase angle of the signal on common lead 11 having the frequency of the channel, as represented by Equations (6) and (7).

The output signals of integrators 19 and 20 are respectively applied to sample and hold networks 22 and 23, which are activated to be responsive to the integrators at the frequency that is the common factor for the frequencies on line 11, i.e., by a 25 Hertz signal, slightly before resetting of integrators 19 and 20. The output signals of sample and hold networks 22 and 23 are supplied as d.c. voltages to analog computer divider networks 24 which generate d.c. output signals commensurate with the ratio of the output of network 22 to the output of network 23, to provide an indication of the tangent of the phase angle $\phi_i$ for the particular channel i; where i is selectively the values 1, 2, 3 and 4 for channels 12, 13, 14 and 15, respectively. The output signals of dividers 24 are supplied to arc tangent networks 25, which generate output signals in accordance with the value of $\phi_i$ for each particular channel.

Consideration is now given to apparatus showing the principles for deriving the predetermined frequencies that are a multiple of a further, common frequency (25 Hertz). A sine wave oscillator 31 for the highest frequency, $f_1$, (8575 Hertz for the cited example) is provided and feeds an output signal directly to channel 12 wherein the phase angle of the received signal having a frequency of 8575 Hertz is detected. The output of oscillator 31 is supplied to a plurality of cascaded frequency dividers 32, 33 and 34, which in the present example provide a divide by 7 frequency division factor, whereby the output signals of the dividers are respectively 1225 Hertz, 175 Hertz, and 25 Hertz. The 25 Hertz output signal of divider 34 is combined in mixer 35 with the output of oscillator 31, and the lower sideband of the resulting product is applied as a sinusoidal input having a frequency of 8550 Hertz to channel 13. To derive the 8400 Hertz and 7350 Hertz reference waves for channels 14 and 15, the output of oscillator 31 is combined with the outputs of frequency dividers 33 and 32 in mixers 36 and 37, respectively. The lower sidebands derived from mixers 36 and 37 are appropriately filtered, to derive sinusoidal signals that are supplied as reference waves to channels 14 and 15.

Resetting of integrators 19 and 20 and control of sample and hold networks 22 and 23 is in response to the 25 Hertz output of frequency divider 34. To this end, the output of divider 34 is applied to differentiator and rectifying network 41 which derives a short duration pulse in response to the leading edge at the beginning of each cycle of the square wave output of frequency divider 34. The pulse derived from network 41 is simultaneously applied in parallel to each of integrators 19 and 20, to reset the integrators to zero. Thereby, all of the integrators 19 and 20 are activated for the same time period for each product signal fed thereto, and this time period is an integral multiple of the reciprocal of the output of frequency divider 34; in the present instance, the integral multiple equals one, a forty millisecond duration. It is to be understood, however, that the multiple could be greater than one, to provide increased signal to noise ratio, in which case the time period during which each of integrators 19 and 20 is activated may be 80 milliseconds, 120 milliseconds, etc. To provide proper synchronization between resetting of integrators 19 and 20 and energization of sample and hold networks 22 and 23 to be responsive to the integrator outputs, a very short duration delay element 42 is connected in series between the output of differentiating and rectifying network 41 and the parallel reset inputs of integrators 19 and 20. The sample and hold networks 22 and 23 are activated a very short time duration, such as 50 microseconds, before the integrators are reset by supplying the output of differentiating and rectifying network 41 in parallel to the sample and hold networks.

The principles of the present invention can also be implemented by utilizing digital computer equivalents to the analog type elements illustrated in FIG. 1. A problem with an exact digital computer implementation of the analog system, however, is the requirement to multiply relatively high frequency samples of the frequency multiplexed signal on line 11 to produce the pairs of product signals in each of the correlation channels. To provide an approximation of the multiplication operations of each correlation channel, in a minimum time period, the digital system of FIG. 2 involves effective multiplication of each signal frequency by sampling the input signal at four equispaced times during each cycle of the reference wave for each channel and multiplying the samples by 0, +1 or −1. Multiplication by 0, +1, or −1, at four equispaced time intervals and appropriate coupling of the sampled signal to a pair of accumulator registers, which are periodically reset, provides the same function as multiplying the signal by sine and cosine functions ad integrating, without utilizing time consuming actual multiplication operations.

Figure 2:
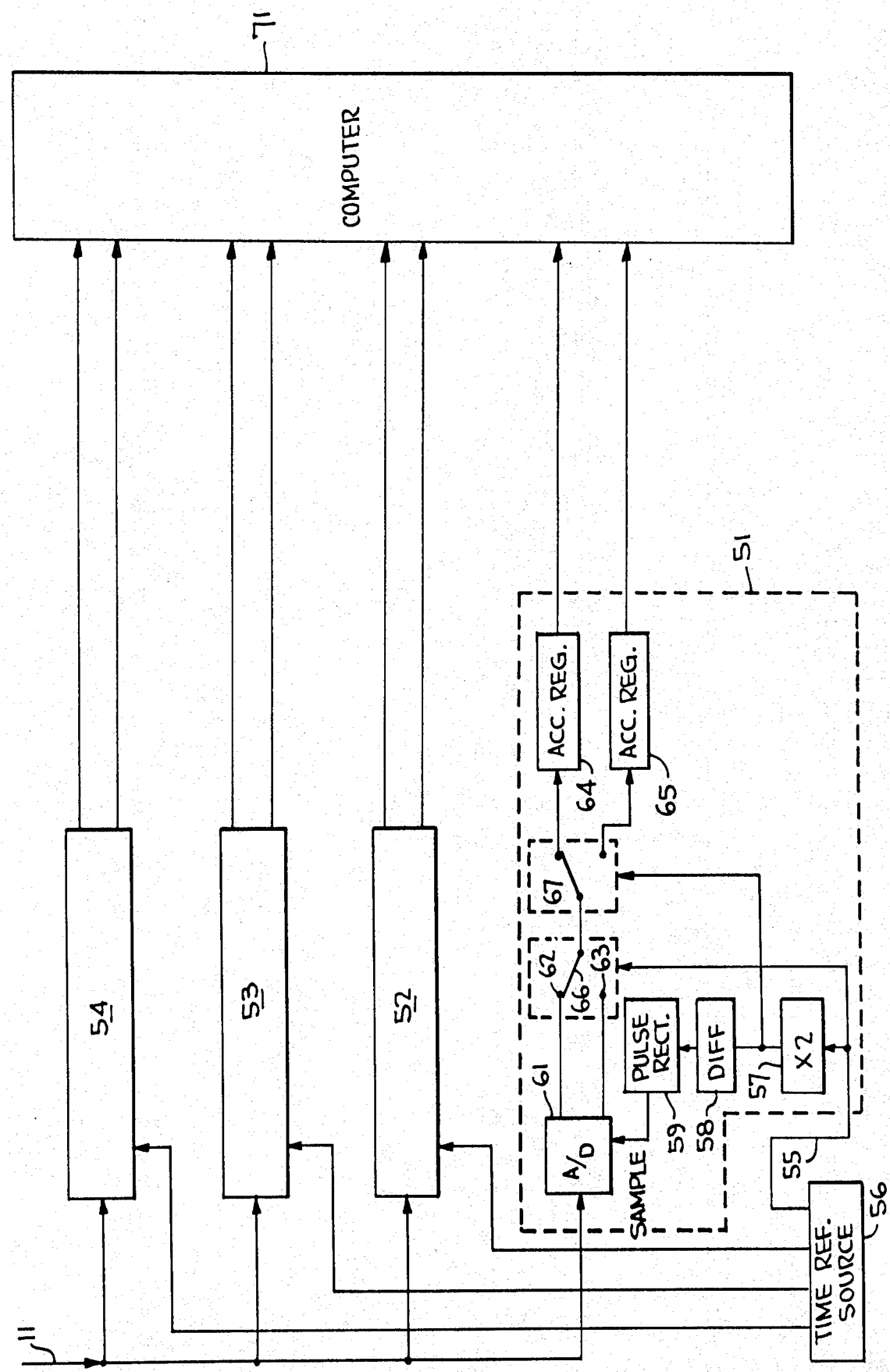
FIG. 2 is a block diagram of a digital embodiment of the present invention.

To consider the specific apparatus of FIG. 2, the composite signal is applied in parallel from common lead 11 to a plurality of identical correlation channels 51–54. Each of channels 51–54 is the same, except for the frequency of the reference signal fed thereto. The frequencies of the reference signals fed to channels 51–54 are respectively 8575 Hertz, 8550 Hertz, 8400 Hertz, and 7350 Hertz, the same frequencies are applied to the correlation channels 12–15 of FIG. 1. These frequencies are derived from an independent time or clock source 56, identical to the time or clock source employed in FIG. 1, except that square waves, rather than sinusoidal waves are applied to each of the channels of FIG. 2. The square waves can be derived by limiting the output of the oscillator and various mixers of FIG. 1 reference sources, or by substituting a square wave oscillator for the sinusoidal oscillator and utilizing appropriate logic circuits in lieu of the mixers.

Consideration is now given to the circuitry in channel 51 for deriving control signals for the elements of the channel. Reference square waves having a frequency of 8575 Hertz, as derived on lead 55 of time reference source 56, are applied to frequency doubler 57, the output of which is a square wave having twice the frequency of the square wave on lead 55. Positive going transitions of the output of doubler 57 are in time coincidence with the positive and negative going transitions of the square wave on lead 55. The square wave derived from frequency doubler 57 is applied to differentiator 58, which derives an output that is applied to a pulse rectifer 59, which derives positive, short duration pulses, typically having a duration on the order of 1 microsecond, in time coincidence with the leading and trailing edges of the output square wave of frequency doubler 57. The 34,300 Hertz pulses, derived from pulse rectifier 59 are applied to a sample input of analog to digital converter 61, having a signal input responsive to the composite signal on line 11. Thereby, the composite signal on line 11 is sampled four times during each cycle of the 8575 Hertz, $f_1$ signal.

Analog to digital converter 61 is a standard commercially available, four quadrant converter capable of accepting bipolarity analog input signals and including circuitry for deriving complementary digital signals on output terminals 62 and 63. The signal on terminal 62 is always of the same polarity as the input signal, while the signal on lead 63 is of opposite polarity from the input signal. The polarity indication of the digital, binary signals derived on leads 62 and 63 is indicated in the usual manner, by the value of the most significant bit of each word in the signal. Typically, a binary zero in the most significant bit position of each word signifies a positive polarity, while a binary one in the most significant bit position signifies a negative polarity magnitude.

The signals on leads 62 and 63 are selectively coupled to accumulator registers 64 and 65 through double pole, single throw cascaded switches 66 and 67 which alternately connect terminals 62 and 63 to registers 64 and 65. Thereby, two different, alternate samples of the input signal are coupled to register 64 during one cycle of the frequency of channel 51 and the other two samples during the cycle are coupled to register 65. One of the samples coupled to each of register 65. One of the samples coupled to each of registers 64 and 65 during each cycle is reversed in polarity relative to the input signal, while the other sample fed to each of the registers during each cycle has the same polarity as the input signal. By energizing switches 66 and 67 in this way, at the end of a time interval equal to an integral multiple of one period of the time reference source for channel 51, the values stored in registers 64 and 65 are commensurate with the sine and cosine of the phase angle of the signal on line 11 having the same frequency as the reference frequency applied to channel 51. During the first half cycle of the reference source applied to channel 51, switch 66 is activated so that it is responsive to the signal on terminal 62, while during the second half cycle of the time reference source, switch 66 is responsive to the signal on terminal 63. Thereby, during the first half cycle of the time reference source the input signal to analog to digital converter 61 is multiplied by plus one (has the same phase as the input signal), and during the second half cycle of the time reference source the input signal to the converter is multiplied by minus one (is phase reversed relative to the input signal).

To derive the sine function, the signal coupled to switch 66 is fed to accumulator register 64 via switch 67 during the first and third quarters or quadrants of the time reference source, while the cosine function is provided by activating switch 67 so that it feeds the signal of switch 66 to accumulator register 65 during the second and fourth quadrants of the time reference source. Thereby, during the first and third quadrants the sine accumulator register 64 is respectively responsive to the sample taken by converter 61 without and with polarity inversion. During the second and fourth quadrants, accumulator register 64 is unresponsive to the sample taken by converter 61 so that the accumulator is effectively responsive to the sample being multiplied by zero. Similarly, during the second and fourth quadrants, cosine accumulator register 65 is responsive to the second and fourth samples taken by converter 61 during a cycle of the time reference wave on lead 55 without and with polarity inversion. During the first and third quadrants, accumulator register 65 is unresponsive to the samples taken by converter 61, whereby an effective multiplication by zero is provided.

To provide control of switches 66 and 67 in the manner stated, the time reference square wave on lead 55 is applied as a control input to switch 66, while the square wave output of frequency doubler 57 is applied as a control input to switch 67. Switch 66 responds to the square wave voltage applied thereto so that while the square wave voltage has a positive value, during the first half cycle of the time reference source, the contact of switch 66 engages terminal 62; while the square wave has a zero value, during the second half cycle, the contact of switch 66 is activated to engage terminal 63. Switch 67 responds to the square wave output of frequency doubler 57 so that while the square wave voltage has a finite, non-zero value, during the first and third quadrants of the time reference source, the contact of switch 67 is connected to accumulator register 64. While the square wave output of frequency doubler 57 has a zero or negative value, switch 67 is energized so that its contact is connected to accumulator register 65. Since such double pole, single throw switches are well known to those skilled in the art, no further details thereof are given.

Correlator channel 51 provides phase information solely with regard to the signal frequency on line 11 that is equal to the frequency of the time reference source 55. This is because analog to digital converter 61 is activated to sample the signal on line 11 at an integral multiple of each cycle of the frequency of channel 51. While components other than those associated with the frequency for channel 51 are derived at the output terminals of converter 61, these components have a net average value of zero over an integral of multiple of cycles of the reference frequency for channel 51. Thereby, the net effect of the other frequencies on the signals in accumulator registers 64 and 65 is zero.

The accumulator registers 64 and 65 of all channels 51–54 are reset to zero at the same frequency, having a time period that is an integral factor of the period of the frequency associated with each of the channels. To this end, time reference source 56 includes a 25 Hertz square wave source, which is derived with apparatus identical to the apparatus utilized to derive the 25 Hertz square wave of FIG. 1. Leading edges of the 25 Hertz waveform are detected as discussed with regard to FIG. 1 and applied to the accumulator registers 64 ad 65 to read out the contents of the accumulator registers and then immediately reset the registers to zero. Thereby, the accumulator registers 64 and 65 function as integrators over an integral multiple of the period for one cycle of channel 51 to provide the same type of integration as is provided in FIG. 1.

The signals read out from the accumulator registers 64 and 65 of channels 51–54 are supplied to digital computer 71, which may be of the usual general purpose type. Computer 71 is programmed to respond sequentially to its several inputs and determine the ratio of the sin $\phi$ and cos $\phi$ signals read out from the accumulator registers of each channel. In response to the ratio of the accumulator signals, computer 71 solves the arc tangent function for the ratio to determine the phase angle for each of the several frequencies on line 11.

While there have been described and illustrated several specific embodiments of the invention, it will be clear that variations in the details of the embodiments specifically illustrated and described may be made without departing from the true spirit and scope of the invention as defined in the appended claims. For example, the digital device of FIG. 2 could be implemented with corresponding analog devices or the analog device of FIG. 1 could be implemented on a straight digital basis, with a computer or hard wired circuitry, provided the frequencies are sufficiently low.

We claim:

1. Apparatus for determining the phase angles of each of a plurality of signals relative to predetermined phase angles of reference waves having the same frequencies as the signals, said plural signals being frequency multiplexed on a common line and each having a different frequency, said frequencies all being an integral multiple of a further frequency, comprising means responsive to the frequency multiplexed signals on the common line and the reference waves for deriving product signals indicative of $\sin(\omega_i t + \phi_i)\sin\omega_i t$ and $\sin(\omega_i t + \phi_i)\cos\omega_i t$ for each of the frequencies, where:

$\omega_i = 2\pi f_i$, $f_i$ is selectively each of the frequencies, $t$ = time, and $\phi_i$ = phase angle between the reference wave and the signal for each of the frequencies $f_i$, integration means responsive to each of the product signals, means for activating the integration means for the same time period for each product signal, said period being an integral multiple of the period of the further frequency, whereby the integration means derives, at the end of each activation period, first and second signals respectively indicative of $\sin\phi$ and $\cos\phi$ for each of the frequencies, and computer means responsive to the first and second signals for each of the frequencies for deriving an indication of $\phi$ for each of the frequencies.

2. Apparatus for determining the phase angles of each of a plurality of signals relative to predetermined phase angles of reference waves having the same frequencies as the signals, said plural signals being frequency multiplexed on a common line and each having a different frequency, said frequencies all being an integral multiple of a further frequency, comprising means responsive to the frequency multiplexed signals on the common line and the reference waves for deriving signals indicative of orthogonal cross correlations of the reference wave with the signal for each of said frequencies, said means including integration means for both of said cross correlations, means for activating the integration means for the same time period for each cross correlation of each frequency, said period being an integral multiple of the period of the further frequency, whereby the integration means derives, at the end of each activation period, first and second signals respectively indicative of $\sin\phi$ and $\cos\phi$ for each of the frequencies, and computer means responsive to the first and second signals for each of the frequencies for deriving an indication of $\phi$ for each of the frequencies.

3. The apparatus of claim 2 wherein the means for deriving the cross correlations for each frequency includes: means for sampling the multiplexed signal four equispaced times during each cycle of the reference wave for the frequency, a pair of integration means, switch means for coupling two different alternate samples of the signal to each of the integration means during each of said cycles, one of said samples being coupled to the integration means with reversed phase relative to the signal and the other sample having the same phase as the signal.

4. The apparatus of claim 2 wherein the means for deriving the cross correlations for each frequency includes: first and second mixer means respectively responsive to the reference wave at phases 0° and 90° and the multiplexed signal for deriving a pair of output signals, said integration means including first and second integrators respectively responsive to the output signals derived by the first and second mixers.

5. Apparatus for determining the phase angle of a frequency multiplexed input signal relative to the phase angle of a frequency multiplexed reference wave having the same frequency as the input signal comprising means responsive to the frequency multiplexed input signal and reference wave for deriving orthogonal cross correlations of the reference wave and the input signal, said means including integration means for each of the cross correlations, a source of timing signals having constant frequency and phase for activating the integration means for a period that is an integral multiple of one cycle of the reference wave frequency, whereby the integration means derives at the end of each activation period first and second signals respectively indicative of sin $\phi$ and cos $\phi$, and computer means responsive to the first and second signals for deriving an indication of $\phi$.

6. The apparatus of claim 5 wherein the means for deriving cross correlation signals includes: means for sampling the input signal four equispaced times during each cycle thereof, switch means for coupling two different alternate samples of the signal to each of the integration means during each of said cycles, one of said samples being coupled to the integration means with reversed phase relative to the signal and the other sample having the same phase as the signal.

7. The apparatus of claim 5 wherein the means for deriving the cross correlations includes: first and second mixer means respectively responsive to the reference wave at phases 0° and 90° and the multiplexed signal for deriving a pair of output signals, said integration means including first and second integrators respectively responsive to the output signals derived by the first and second mixers.

8. In an apparatus for measuring the phase angle of an input signal relative to the phase angle of a reference wave having the same frequency as the input signal, means for sampling the input signal four equispaced times during each cycle thereof, first and second integration means, switch means for coupling two different alternate samples of the signal to each of the integration means during each of said cycles, one of said samples being coupled to the integration means with reversed phase relative to the signal and the other sample having the same phase as the signal, and means for activating the integration means for a period that is an integral multiple of the period of one cycle of the reference wave.

9. The apparatus of claim 8 wherein the means for sampling comprises an analog to digital converter, and each of the integration means includes an accumulator register.

10. The apparatus of claim 8 wherein the switch means comprises a pair of cascaded double pole single throw switches.

* * * * *